United States Patent
Andrews et al.

(10) Patent No.: US 9,684,475 B2
(45) Date of Patent: Jun. 20, 2017

(54) MULTI-MODE HYBRID STORAGE DRIVE

(71) Applicant: Dell Products, L.P., Round Rock, TX (US)

(72) Inventors: Carlton A Andrews, Austin, TX (US); Gary Douglas Huber, Austin, TX (US); Munif Mohammed Farhan, Round Rock, TX (US); Todd Swierk, Austin, TX (US); William F. Sauber, Georgetown, TX (US); Philip M. Seibert, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 165 days.

(21) Appl. No.: 14/194,652

(22) Filed: Feb. 28, 2014

(65) Prior Publication Data
US 2015/0248247 A1 Sep. 3, 2015

(51) Int. Cl.
*G06F 12/00* (2006.01)
*G06F 3/06* (2006.01)
*G06F 11/30* (2006.01)

(52) U.S. Cl.
CPC .......... *G06F 3/068* (2013.01); *G06F 3/0617* (2013.01); *G06F 3/0634* (2013.01); *G06F 11/30* (2013.01)

(58) Field of Classification Search
CPC ...... G06F 3/068; G06F 3/0634; G06F 3/0617; G06F 11/30
See application file for complete search history.

(56) References Cited

U.S. PATENT DOCUMENTS

| | | | |
|---|---|---|---|
| 8,670,205 B1* | 3/2014 | Malina | G06F 3/0625 360/69 |
| 2008/0005462 A1* | 1/2008 | Pyeon | G06F 3/061 711/113 |
| 2008/0024899 A1* | 1/2008 | Chu | G06F 3/0614 360/69 |
| 2008/0147984 A1* | 6/2008 | Khan | G06F 12/0804 711/135 |
| 2008/0162915 A1* | 7/2008 | Price | G06F 21/57 713/2 |

\* cited by examiner

*Primary Examiner* — Gurtej Bansal
(74) *Attorney, Agent, or Firm* — Fogarty LLP

(57) ABSTRACT

Embodiments of systems and methods for managing a multi-mode hybrid storage device are described. In an embodiment, a method includes identifying an operational state of a system having a hybrid data storage device and an interfacing processor configured to interface with the hybrid data storage device. A method may also include interacting with the hybrid data storage device according to one of a plurality of interaction modes in response to the operational state of the system.

7 Claims, 8 Drawing Sheets

MULTI-MODE HYBRID STORAGE DRIVE

FIELD

This disclosure relates generally to computer systems, and more specifically, to a multi-mode hybrid storage drive.

BACKGROUND

In general, Information Handling Systems (IHS) include a processing device, a memory device for storing computer code that, when executed by the processor, causes the IHS to perform various operations on data and a data storage device for storing the data. Failures can occur in such systems when data stored in the data storage device becomes inaccessible, either due to a problem with the programs executing on the processor, or due to a physical problem with the data storage device. For example, a magnetic data storage device may include multiple magnetic disks which are configured to spin at a high rate of speed and store data thereon. Because the magnetic disks are typically made of fragile material and because they spin at such a high rate of speed, hard disk drives can easily become damaged if dropped, vibrated, or exposed to various other environmental or electrical conditions that may be damaging.

Often, a failure of a hard disk drive can be catastrophic, meaning that the data that has been stored on the hard disk drive may become inaccessible unless the disks are removed from the drive and installed in a data recovery device. Such recovery methods can be too costly or time consuming to be practical, so the data stored on the disk drive may be lost. Additionally, disk errors can become frustrating for computer users, because the system may not respond as expected or because data representing significant time expenditure, financial value, or sentimental value may be lost. An additional cost of such errors is the loss of user productivity and associated opportunity costs.

Solid State Memory assisted storage devices, such as hybrid Hard Disk Drives using Flash memory (Hybrid HDDs), use a combination of storage media including, for example, magnetic disk drives in combination with flash memory. Such devices may use the flash as a cache to enhance performance. Generally though, each device may contain one caching policy at a time and it is not able to dynamically change the policy based on the current application/usage of the device. Therefore, the device behavior is target as "one size fit all" and does not typically change the device attributes based on the system condition or specific usage case.

In the event of a storage device failure or corrupted operating system, the end user does not have the ability to reboot their system. Thus the user may be at a standstill from a productivity perspective.

SUMMARY

Embodiments of systems and methods for managing a multi-mode hybrid storage device are described. In an embodiment, a method includes identifying an operational state of a system having a hybrid data storage device and an interfacing processor configured to interface with the hybrid data storage device. A method may also include interacting with the hybrid data storage device according to one of a plurality of interaction modes in response to the operational state of the system.

In one embodiment, the hybrid data storage device comprises a hard disk drive component and a solid state drive component. The hybrid data storage device may be configured to operate in a hybrid mode in which both the hard disk drive component and the solid state drive component are addressable by an interfacing processor. Alternatively, the hybrid data storage device is configured to operate in a hard disk drive mode in which only the hard disk drive component is addressable by an interfacing processor. In another embodiment, the hybrid data storage device is configured to operate in a solid state drive mode in which only the solid state drive component is addressable by an interfacing processor.

In one embodiment, an operational state of the system comprises an initialization state in which an interfacing processor is configured to load system software from the hard disk drive component and establish a partition in the solid state drive component for hosting an alternate operating system and a cache of persistently accessible files. In another embodiment, the operational state of the system comprises a normal operation state in which a subset of files stored by a primary operating system on the hard disk drive component is stored in a cache of persistently accessible files. Alternatively, the operational state of the system comprises a degraded state in which an alternate operating system hosted by the solid state component is configured to run on an interfacing processor in response to a detected degradation of a performance characteristic of a primary operating system or the hard disk drive component. In still another embodiment, the operational state of the system comprises a recovery state in which files stored in a cache of persistently accessible files stored on the solid state component are accessible by an interfacing processor.

Embodiments of an Information Handling System (IHS) are also presented. In an embodiment, the IHS includes a hybrid data storage device. The IHS may also include an interfacing processor configured to interface with the hybrid data storage device. Additionally, the IHS may include a memory coupled to the interfacing processor, the memory including program instructions stored thereon that, upon execution by the interfacing processor, cause the interfacing processor to identify an operational state of the IHS system, and interact with the hybrid data storage device according to one of a plurality of interaction modes in response to the operational state of the system.

Embodiments of a non-transitory computer-readable medium having program instructions stored thereon that, upon execution by an Information Handling System (IHS) are also presented. In one embodiment, the operations performed by the IHS may include identifying an operational state of a system having a hybrid data storage device and an interfacing processor configured to interface with the hybrid data storage device, and interacting with the hybrid data storage device according to one of a plurality of interaction modes in response to the operational state of the system.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present embodiments describe an IHS configured with a hybrid data storage device that is configured to operate according to one of multiple modes depending upon an operational state of the IHS. In one such embodiment, the IHS may include a drive mode controller configured to detect an operational state of the IHS and to allow a processing device to interface with the hybrid storage device according to one of the plurality of modes. In an embodiment, the hybrid storage device may include multiple distinct types of storage media. For example, a hybrid drive may include a magnetic hard disk drive and also a solid state drive in one embodiment. Modes of operation may include: a hybrid mode where both the hard disk drive and the solid state drive are accessible; a hard disk drive mode where only the hard disk drive is accessible; and a solid state drive mode where only the solid state drive is accessible. Access to the hard disk drive component or the solid state drive component of the hybrid drive may be limited by limiting logical block addressing for the drives respectively.

Figure 1:
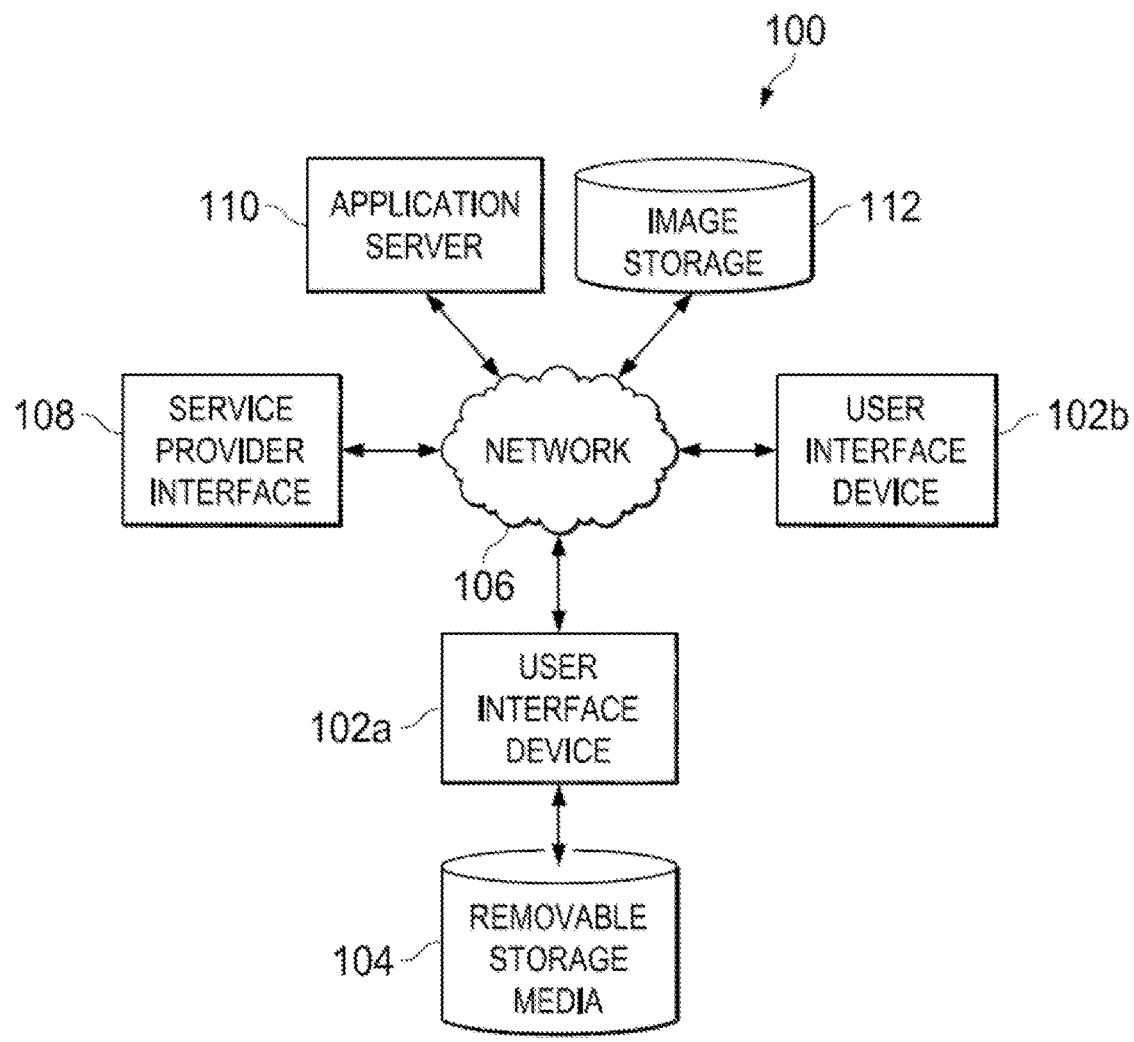
FIG. 1 is a diagram illustrating one embodiment of a system for persistent productivity.

FIG. 1 is a diagram illustrating one embodiment of a system 100 for managing a multi-mode hybrid storage drive. In an embodiment, the system 100 includes one or more user interface devices 102a-b. The user interface devices 102a-b may be computing devices, such as desktop computers, laptop computers, tablet computing devices, mobile computing devices, etc. In other embodiments, the user interface devices may include or be coupled to servers, networking devices, security appliances, or the like. In still other embodiments, the user interfaces may be of diverse types. For example, a first user interface device 102a may be a desktop workstation, and a second user interface device 102b may be a mobile computing device or a tablet computing device. In certain embodiments, aspects of the first user interface device 102a may be tied or related to aspects of the second user interface device 102b. For example, a selection of a user's files, accounts, configuration, applications, etc. may be shared between the first user interface device 102a and the second user interface device 102b. One of ordinary skill will recognize a variety of user interface devices 102a-b that may be configured according to the present embodiments.

In an embodiment, the system 100 may include a removable storage medium 104 which may store information used by the user interface device 102a. Examples of removable storage media 104 include flash memory drives, Secure Digital (SD) cards, optical storage disks, external magnetic disk drives, external Solid State Drives (SSD), etc. In an embodiment, the removable storage media 104 may communicate with the user interface device 102a through a data communication port, such as a Universal Serial Bus (USB) port, or the like. Alternatively, the removable storage media 104 may communicate with the user interface device 102a wirelessly through, e.g., a WiFi or Bluetooth communication interface.

User interface devices 102a-b may be configured to communicate via an interface to network 106. Network 106 may include a Local Area Network (LAN), a Wide Area Network (WAN) connection, a connection to the Internet, etc. The network 106 may include various components, such as network routing devices, network switching devices, network hubs, network firewalls, wireless access points, mobile data connections, telecommunications network backbone hardware, etc. In various embodiments, the network 106 may be configured to receive communication requests from the user interface devices 102a-b and transmit responses from other devices connected to the network 106 back to the user interface devices 102a-b.

In an embodiment, the system 100 may include one or more devices or subsystems which may be provided to service the user interface devices 102a-b. For example, service provider interface 108 may be provided to allow a service provider to communicate with the user interface device 102a. In one example, embodiment, the service provider may be a technical support technician. The technical support technician may establish a user support session, such as a chat session with a user of the user interface device 102a, b. The user support session may additionally include a remote access session, a file transfer session, a voice or video connection, etc. In an embodiment, the user support session may be requested by the user of the user interface device 102a, b. In another embodiment, the user interface device 102a, b may automatically request the user support session in response to encountering a system error.

In an embodiment, the system 100 may also include an application server 110. In such an embodiment, the application server 110 may provide the user interface devices 102a-b with access to one or more applications 110. For example, the user interface device 102a-b may operate as a thin client which displays video related to operations of an application hosted by application server 110, but does not directly handle processing of data associated with operation of the application. In a further embodiment, the user interface device 102a-b may additionally provide an interactive interface allowing the user to enter data or manipulate operation of the application. Data and commands entered by the user at the user interface device 102a, b may be communicated to application server 110 via network 106.

In one example, the application server 110 may be accessed by the user interface device 102a, b in the event of a failure being detected at the user interface device 102a. For example, in the event of a system failure of an operating system, the user interface device 102a, b may automatically switch to a fault recovery mode. In the fault recovery mode, the user interface 102a may still be used by the user to perform tasks, but the operating system may be operated on the application server 110 and the user interface device 102a may simply operate as a user interface client of the application server 110 allowing the user to enter inputs which are communicated to the application server 110 via network 106, and seeing responsive actions of the operating system on the application server 110. One of ordinary skill will recognize additional examples involving applications which may be hosted by application server 110, including word processing applications, email applications, photo editing applications, etc.

In an embodiment, image storage 112 may provide remote storage functionality for user interface device 102a. In one embodiment, the image storage 112 may store a complete image of the data stored on user interface device 102a, b. In another embodiment, the image storage 112 may store a partial image of data stored on the user interface device 102a, b. For example, a selection of files or folders stored on the user interface device 102a may be designated for storage on the image storage 112. In such an embodiment, the files or folders may be communicated to image storage 112 via network 106 for storage. In still another embodiment, incremental changes to information stored on the user interface device 102a may be communicated to image storage device 112, such that the copies of information stored on image storage 112 are synchronized with the information stored on user interface device 102a.

The system 100 of FIG. 1 is just one example of a possible system which may be used according to the present embodiments. Certain components of system 100 may be added or omitted without substantial change to the fundamental operation of the system. For example, while it may be useful to include a removable storage media 104, this component of system 100 may be omitted in various embodiments. Similarly, a user interface device 102 may access an application server during a user support session, but this component of system 100 may also be omitted in various embodiments. Additionally, image storage 112 may be useful to a service technician during a user support session, but this component may also be omitted in various embodiments. One of ordinary skill will also recognize that certain components may be added to system 100.

Figure 2:
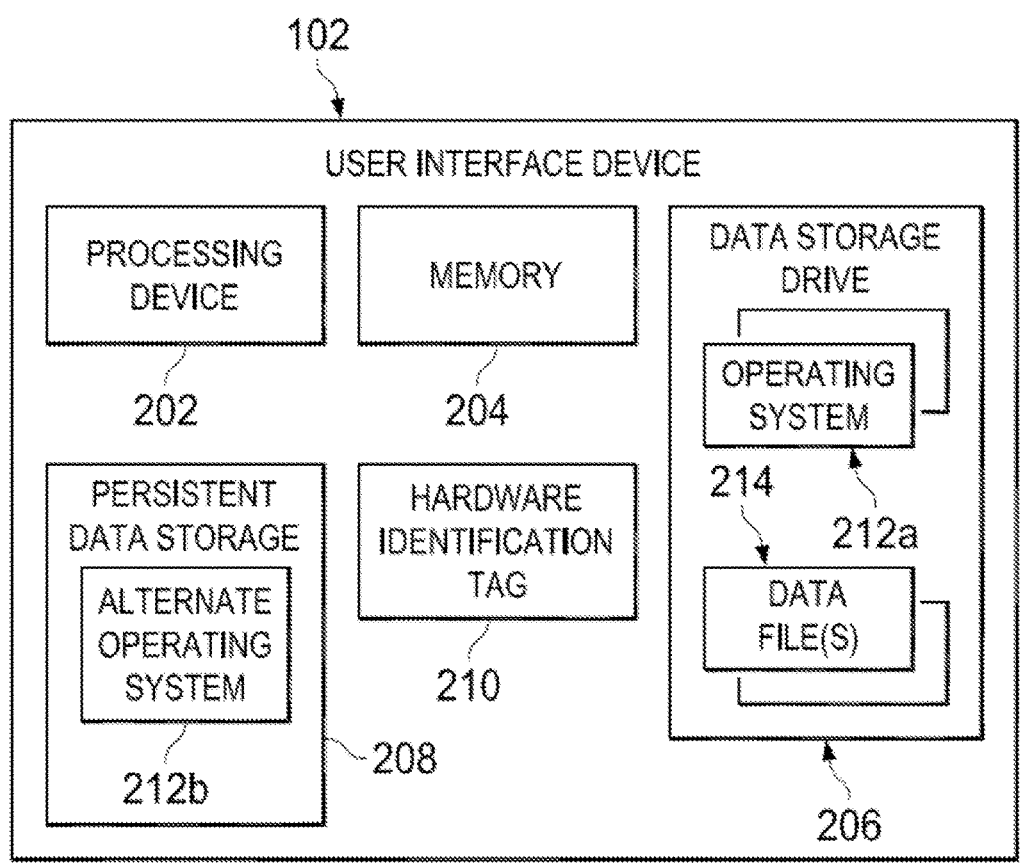
FIG. 2 is a diagram illustrating one embodiment of a user interface device configured for persistent productivity.
Figure 4:
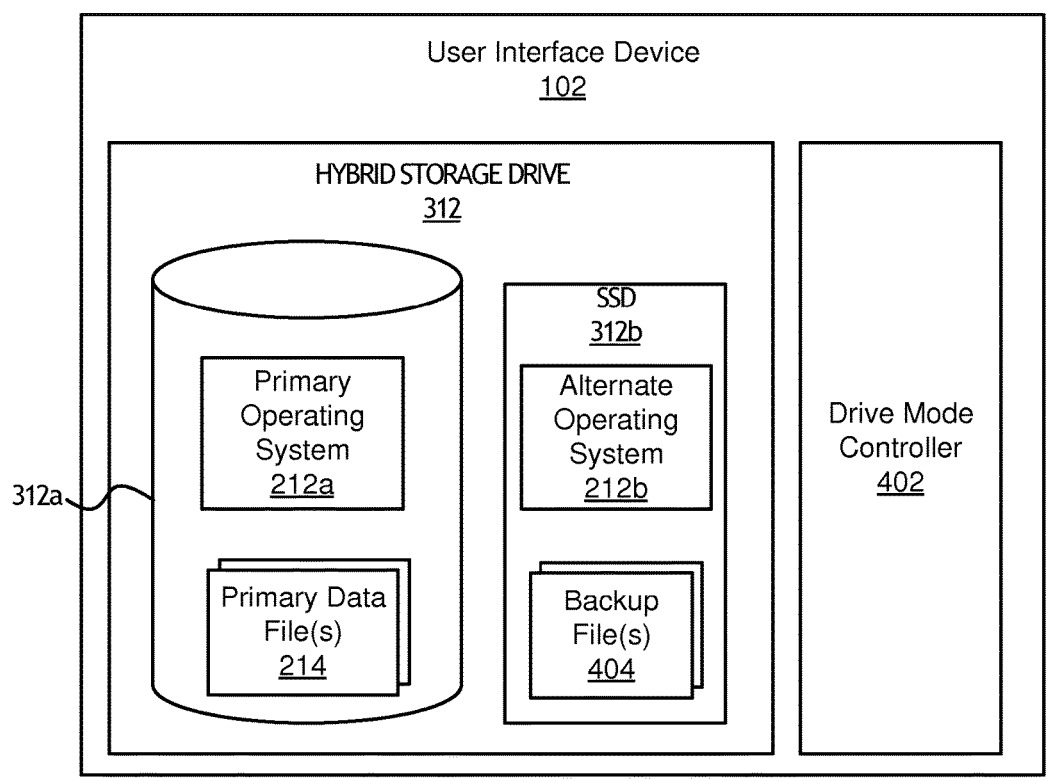
FIG. 4 is a diagram illustrating another embodiment of a user interface device having a multi-mode hybrid storage drive.

FIG. 2 is a diagram illustrating one embodiment of a user interface device 102 configured for managing a multi-mode hybrid storage drive. In an embodiment, the user interface device 102 may include a processing device 202, a memory 204, a data storage drive 206, a persistent data storage 208, and a unique identifier 210. In various embodiments, the unique identifier 210 may be a hardware identification tag, a system-specific service tag, etc. One of ordinary skill will recognize alternative embodiments of a user interface device 102. For example, in certain embodiments the user interface device 102 may omit certain elements described in FIG. 2, or may add certain additional elements not described in FIG. 2. An alternative embodiment of a user interface device is shown in FIG. 4.

In an embodiment, the processing device 202 may execute programmed instructions stored in the memory 204 or the data storage drive 206. For example, the data storage drive may store program code associated with a first operating system 212. Portions of the code for the first operating system 212 may be loaded by the processing device 202 into the memory 204. In an embodiment, the first operating system is a Windows® operating system available from Microsoft® Corporation. Additionally, the processing device 202 may access data files stored in either the memory 204 or the data storage drive 206. In an embodiment, a user of the user interface device 202a may access data files 214 using controls provided by the operating system 212.

In certain embodiments, one or more data files 214, or the first operating system 212a may experience a fault. Faults may include hardware malfunctions or failures or software failures. In such an embodiment, the processor 202 may access code for system recovery. In a particular embodiment, the system recovery code may cause the processor 202 to load a second operating system, such as an alternate operating system 212b.

Additionally, in various embodiments, the processing device 202 may store user data on a persistent data storage 208 for recovery in the event of a fault. In a particular embodiment, the persistent data storage device 208 may store recently accessed files. In another embodiment, the persistent data storage 208 may contain code for the alternate operating system 212b. In such an embodiment, the alternate operating system 212b may still be accessible, even if the data storage drive is inaccessible. In still other embodiments, the persistent data storage 208 may store system configuration settings, system fault logs, system status logs, etc. In a particular embodiment, the persistent data storage 208 may be non-volatile data storage, such as flash storage. In still a further embodiment, data in the persistent data storage 208 may be accessible on removable storage media 104.

Figure 3:
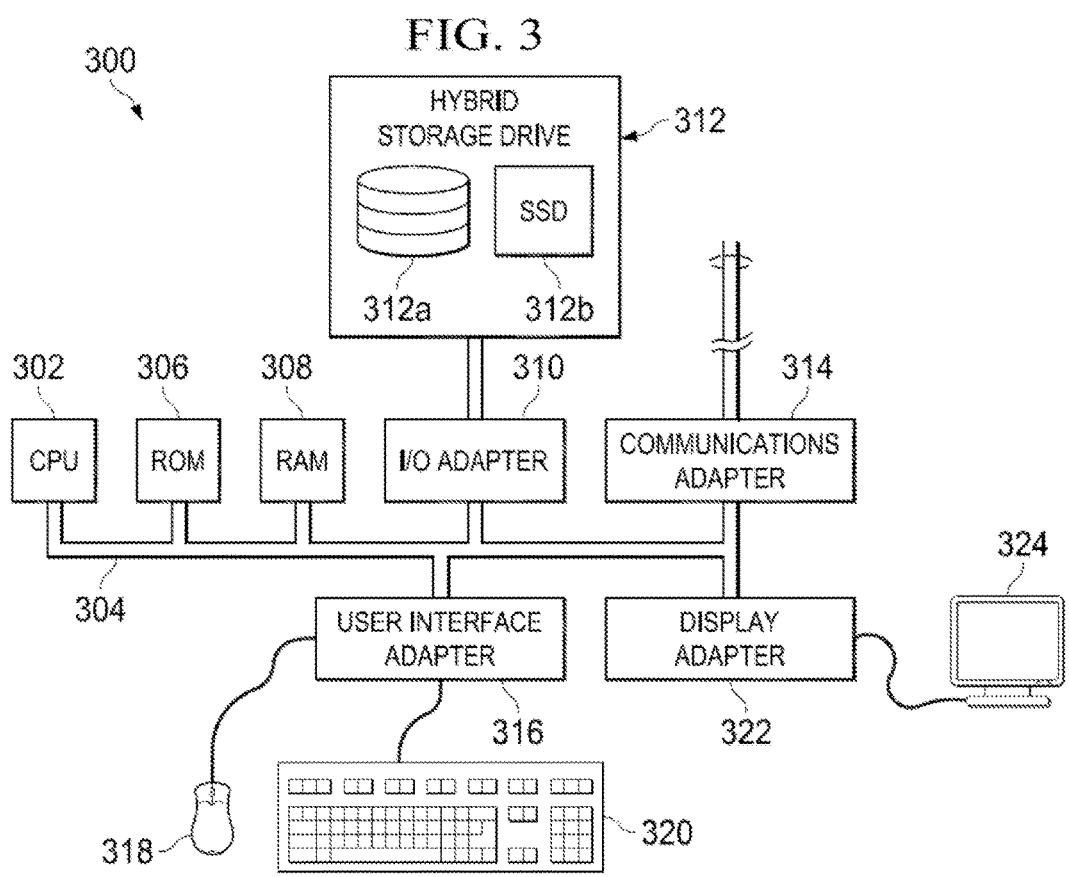
FIG. 3 is a block diagram of an example of an Information Handling System (IHS) according to some embodiments.

FIG. 3 illustrates a computer system 300 adapted according to certain embodiments of a user interface device 102a-b, the service provider interface 108, the application server 110, and/or the image server 112. The central processing unit (CPU) 302 is coupled to the system bus 304. In an embodiment, the processing device 202 may be implemented with CPU 302. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIGS. 6-8.

The computer system 300 also may include Random Access Memory (RAM) 308, which may be SRAM, DRAM, SDRAM, or the like. The computer system 300 may utilize RAM 308 to store the various data structures used by a software application configured to maintain technical support continuity across system restarts and multiple operating systems. The computer system 300 may also include Read Only Memory (ROM) 306 which may be PROM, EPROM, EEPROM, optical storage, or the like. The ROM may store configuration information for booting the computer system 300. The RAM 308 and the ROM 306 hold user and system 100 data. In various embodiments, memory 204 of user interface device 102 may be implemented with ROM 306 and/or RAM 308.

The computer system 300 may also include an input/output (I/O) adapter 310, a communications adapter 314, a user interface adapter 316, and a display adapter 322. The I/O adapter 310 and/or user the interface adapter 316 may, in certain embodiments, enable a user to interact with the computer system 300 in order to input information for interacting with operating system 212. In a further embodiment, the display adapter 322 may display a user support session, such as a chat window.

The I/O adapter 310 may connect to one or more storage devices 312, such as one or more of a hard drive, a Compact Disk (CD) drive, a floppy disk drive, a tape drive, to the computer system 300. In a particular embodiment, the storage devices 312 may be hybrid storage drives, which include both magnetic data storage disks 312a and a SSD 312b. In other embodiments, flash memory may be substituted for the SSD 312b. The SSD 312b may comprise the persistent data storage 208, which in one embodiment, may store code for the alternate operating system 212b. The communications adapter 314 may be adapted to couple the computer system 300 to the network 106, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), computer game consoles, tablet computers, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

FIG. 4 is a diagram illustrating another embodiment of a user interface device 102 configured for managing partitions in hybrid storage drives 312. In an embodiment, the user interface device 102 may include a hybrid storage drive 312, which may include, for example, a hard disk drive (HDD) 312a and an associated solid state drive (SSD) 312b. The HDD 312a may store the primary operating system 212a and the primary data files 214. The SSD 312b may store the alternate operating system 312b. In a further embodiment, the SSD 312b may also store one or more backup files 404. In an embodiment, the hybrid storage drive 312 may be configured to operate according to a plurality of operation modes as defined and controlled by a drive mode controller 402. For example, the drive mode controller 402 may cause the hybrid storage drive 312 to operate as a HDD only in certain operational states. In other operational states, the drive mode controller 402 may cause the hybrid storage drive 312 to operate as an SSD 312b only. In still other operational states, the drive mode controller 402 may cause the hybrid storage drive 312 to operate in a hybrid mode where both the HDD 312a and the SSD 312b are operational and accessible. For example, drive mode controller 402 may be implemented cooperatively in hybrid storage drive 312 and CPU 302, and HDD 312a and SSD 312b may be a single physical device such as a hybrid drive.

Figure 5:
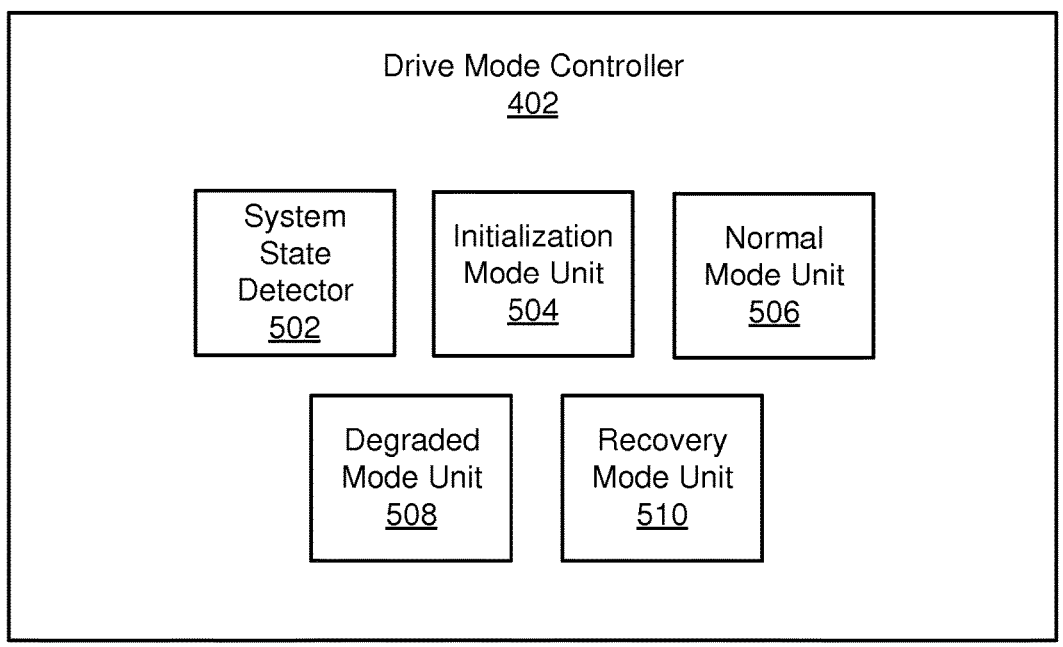
FIG. 5 is a block diagram illustrating one embodiment of a drive mode controller.

FIG. 5 is a block diagram illustrating one embodiment of a drive mode controller 404. In an embodiment, the drive mode controller 404 may include a system state detector 502. The system state detector 502 may be configured to identify an operational state of the user interface device 102. Various operational states may be defined according to one or more state definition policies. In an embodiment the operational states may be defined in response to one or more system performance characteristics, one or more software events, one or more physical characteristics of the system as indicated by one or more sensors, or the like. In a particular embodiment, the system states may include an initialization mode, a normal operation mode, a degraded mode, and a recovery mode. In an example, the system state detector 502 may identify the user interface device 102 as operating in an initialization mode immediately upon system boot until a predetermined state of the primary operating system 212a has been achieved. Once the primary operating system 212a has reached a predetermined operating state, the system state detector 502 may determine that the system is in normal operating mode. If a system failure occurs, the system state detector 502 may determine that the system is in a degraded mode. Once a system error remediation process has been initiated, the system state detector 510 may trigger a recovery mode. One ordinary skill in the art will recognize alternative criteria for determining a system state. For example, rather than referring to an operational state of the primary operating system 212a, the system state detector may monitor an operational state of the hybrid storage drive 312, for example.

In addition to the system state detector 502, the drive mode controller 402 may include one or more additional operational modules for managing operation of the hybrid storage drive 312 in response to the one or more states detected by the system state detector 502. For example, the drive mode controller 402 may include an initialization mode unit 504, a normal mode unit 506, a degraded mode unit 508, and a recovery mode unit 510.

In one embodiment, the initialization mode unit 504 is configured to manage operation of the hybrid storage drive 312 during an initialization state. During the initialization state, the CPU 302 may be configured to load system software from the HDD 312a. Thus, in one embodiment, the initialization mode unit 504 may cause the HDD 312a component of the hybrid storage drive 312 to be addressable. Additionally, during initialization the initialization mode unit 504 may also establish a partition in the SSD 312b component of the hybrid storage drive 312 for hosting the alternate operating system 212b and a cache of persistently accessible files or backup files 404. Thus, in one embodiment the initialization mode unit 504 may cause the hybrid storage device 312 to operate in a hybrid mode, where both the HDD 312a and the SSD 312b components are addressable.

In one embodiment, the system state detector 502 may determine that the system is in a normal state. In the normal state, the normal mode unit 506 may cause the hybrid storage drive 312 to report to the primary operating system in HDD mode where only the HDD component 312a is addressable for storage of primary data files 214. Nonetheless, the SSD component 312b may still be separately addressable by certain background processes and/or agents. For example, in one embodiment as described in FIG. 6, a persistent cache handler 602 may operate as an agent or background process to identify a subset of the primary data files 214 to store as backup files 404 in a persistent data cache.

Figure 6:
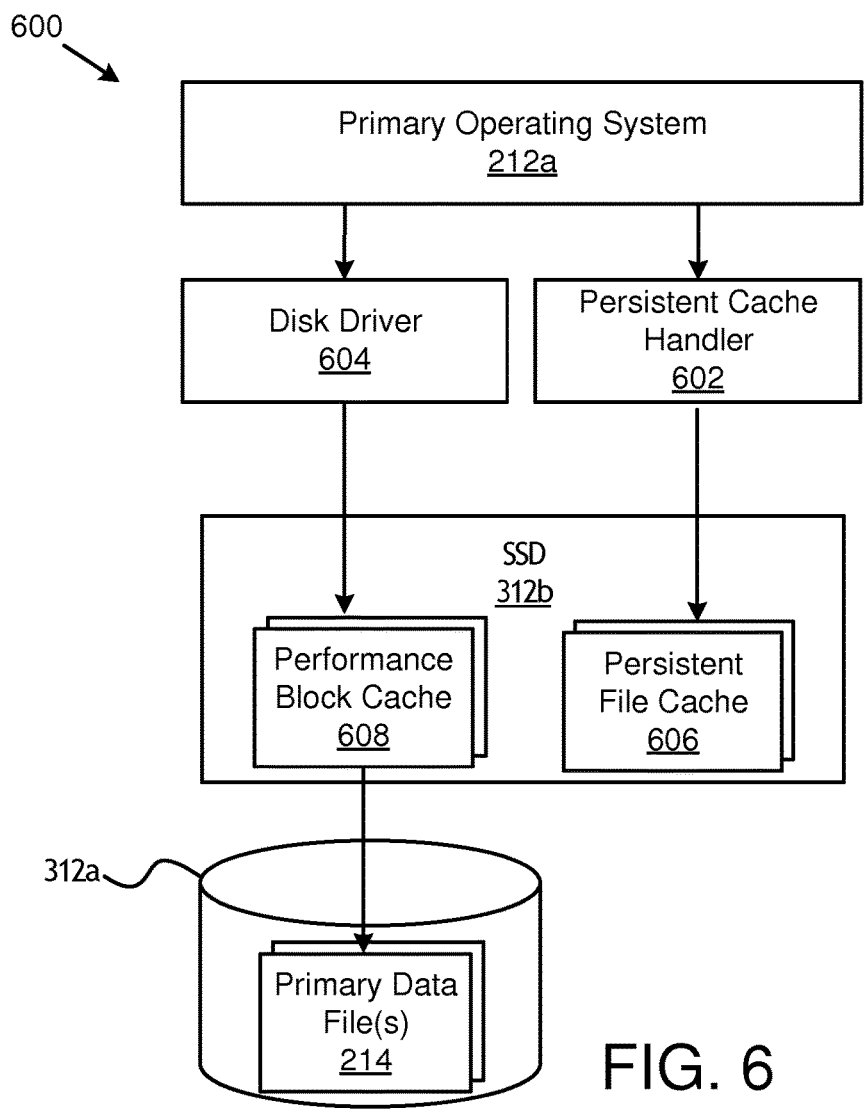
FIG. 6 is a software stack diagram illustrating one embodiment of a software system for managing a multi-mode hybrid storage drive.

FIG. 6 is a software stack diagram illustrating one embodiment of a computer system for a dynamically updated user data cache for persistent productivity. As described above, during normal mode, the primary operating system 212a may store primary data files 214 in a primary data storage device 312a, such as a magnetic disk drive. To do this, the primary operating system 212a may run a disk driver 604 which is configured to handle storage of the primary data files 214. The disk driver 604 may store part of the primary data files 214 in a performance block cache 608. The performance block cache 608 may be stored on an SSD 312b storage module of a hybrid storage device in one embodiment. The primary data files 214 may them be copied from the performance block cache 608 to the primary storage device 312a.

Additionally, the operating system 212a may operate a persistent cache handler 602. In an embodiment, the persistent cache handler 602 is the agent 402. The persistent cache handler 602 may identify a set of the primary data files 214 to store in a persistent file cache 606 as backup files 404. In an embodiment, the persistent file cache 606 may also be stored on an SSD 312b portion of a hybrid storage drive 312. Although both the HDD 312a component and the SSD 312b components may be used during normal mode, the hybrid storage drive 312 may only appear as a HDD 312 to the user and to applications running on the primary operating system 212a during normal operation. Additionally, during normal mode only the primary operating system 212a is operational, and the alternate operating system 212b remains dormant.

Referring back to FIG. 5, in the event of a system failure, particularly a failure involving the HDD 312a component of the hybrid storage drive 312, the system state detector 502 may determine that the system is running in a degraded state and trigger the degraded mode unit 508 to handle management of the hybrid storage drive 312. In such an embodiment, the degraded mode unit 508 may cause the hybrid storage drive 312 to operate as an SSD, where only the SSD 312b component of the hybrid storage drive 312 is addressable. In such an embodiment, the degraded mode unit 508 may allow the alternate operating system 212b to boot and access backup files 404 stored in the persistent file cache 606 during normal mode. In such an embodiment, the user of the user interface device 102 may be able to pick up where he or she left off from a productivity perspective by using the alternate operating system 212b to access the backup files 404 until the system can be repaired. Additionally, the alternate operating system may facilitate initiation of a system fault remediation or technical support session with a remote service provider. In one embodiment, the alternate operating system 212b may provide the hardware identification tag 210 to the remote service provider for establishing a persistent technical support session.

The system state detector may identify a recovery system state in response to a determination that the user has initiated a virus scan of the HDD 312a component, in response to a determination that a technical support session has been established, or in response to other predetermined criteria. In such an embodiment, the recovery mode unit 510 may handle management of the hybrid storage drive 312. In an embodiment, the recovery mode unit 510 may cause the hybrid storage drive 312 to operate in a hybrid mode where the alternate operating system 212b can access both the SSD 312b and the HDD 312a components of the hybrid drive. For example, the alternate operating system 212b may access backup files 404 and other applications or services hosted on the SSD 312b and at the same time access the HDD 312a for error remediation measures such as determining the state of the HDD 312a, running a virus scan, repairing corrupt files, defragmenting the drive, etc.

Figure 7:
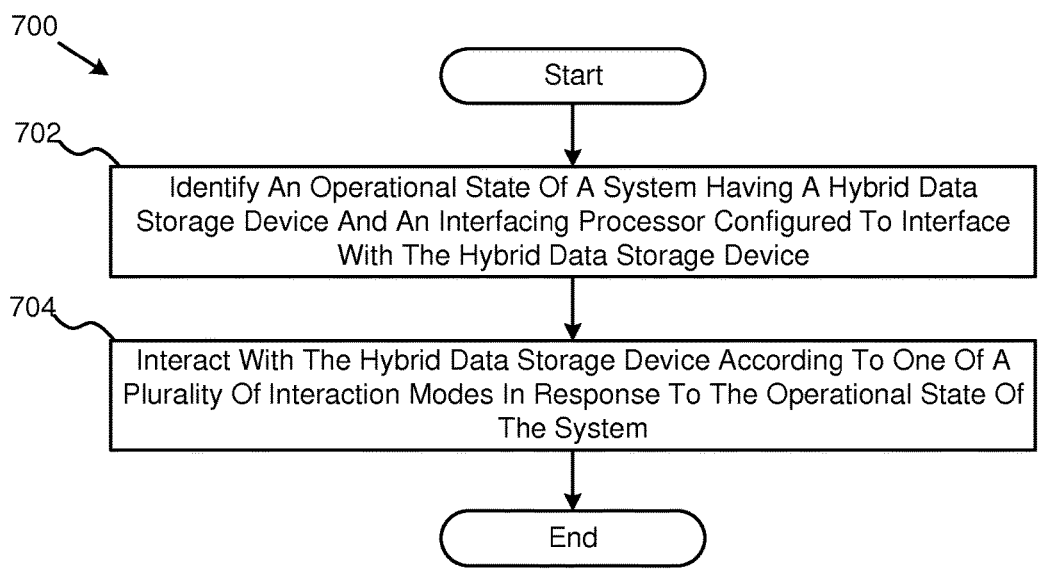
FIG. 7 is a flowchart diagram illustrating one embodiment of a method for managing a multi-mode hybrid storage drive.

FIG. 7 is a flowchart diagram illustrating one embodiment of a method 700 for managing a multi-mode hybrid storage drive 312. In an embodiment, the method 700 starts when the system state detector 502 identifies an operational state of a system 102 having a hybrid data storage device 312 and an interfacing processor, such as the drive mode controller 402 or CPU 302 for example, the interfacing processor configured to interface with the hybrid data storage device 312 as shown at block 702. As shown at block 704, the method 700 may further include interacting with the hybrid data storage device 312 according to one of a plurality of interaction modes in response to the operational state of the system 102.

Figure 8:
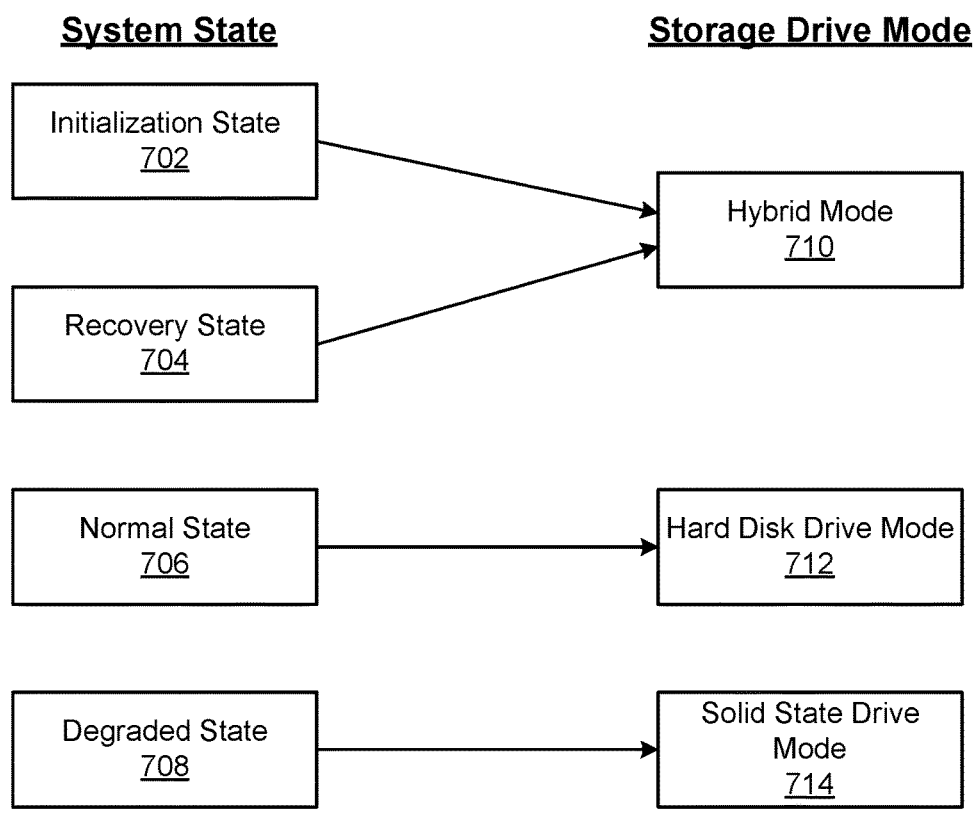
FIG. 8 is a system state diagram illustrating one embodiment of a method for managing a multi-mode hybrid storage drive.

FIG. 8 is a system state diagram illustrating a further embodiment of a method for managing a multi-mode hybrid storage drive 312. As described in FIG. 8, the user interface device 102 may operate according to one or more of a plurality of system states as defined by predetermined criteria. In an embodiment, the system states may include an initialization state 802, a normal state 806, a degraded state 808, and a recovery state 804. As described above with relation to FIG. 5, during both the initialization state 802 and the recovery state 804, the hybrid data storage device 312 may operate in a hybrid mode 810. During the normal state 806, the hybrid data storage device 312 may operate in a HDD mode 812. During degraded state 808, the hybrid data storage device 312 may operate in a SSD mode 814. One of ordinary skill will recognize that alternative or additional system states and operational modes may be defined according to system or user requirements.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a hybrid data storage device having a magnetic disk drive component and a solid state drive component;
an interfacing processor configured to interface with the hybrid data storage device; and
a memory coupled to the interfacing processor, the memory including program instructions stored thereon that, upon execution by the interfacing processor, cause the interfacing processor to:
automatically identify a first operational state of the IHS, wherein the first operational state is selected from the group consisting of: an initialization state, a normal state, a degraded state, and a recovery state;
automatically interact with the hybrid data storage device in a first one of a plurality of interaction modes corresponding to the first operational state of the IHS, wherein the interaction modes include: a hybrid mode, a hard disk drive mode, or a solid state drive mode;
automatically identify a change from the first operational state to a second operational state; and
in response to the automatic identification of the change, automatically interact with the hybrid data storage device in the second interaction mode, wherein the second interaction mode corresponds to the second operational state, wherein the magnetic disk drive component is configured to store a primary operating system and primary files, and wherein the solid state drive component is configured to store an alternate operating system and a cache of persistently accessible files, wherein in the hybrid mode both the magnetic disk drive component and the solid state drive component are addressable, and wherein in the initialization state the interfacing processor is configured to: interface with the hybrid data storage device in the hybrid mode causing both the magnetic disk drive component and the solid state drive component to be addressable by the primary operating system; load the primary operating system from the hard disk drive component; and establish a partition in the solid state drive component for hosting the alternate operating system and the cache of persistently accessible files.

2. A non-transitory computer-readable medium having program instructions stored thereon that, upon execution by an Information Handling System (IHS), cause the IHS to:
identify, autonomously by the IHS, an operational state of the IHS, wherein the operational state of the IHS is selected from the group consisting of: an initialization state, a normal state, a degraded state, and a recovery state, the IHS having a hybrid data storage device and an interfacing processor configured to interface with the hybrid data storage device, and the hybrid data storage device having a magnetic disk drive component and a solid state drive component;
interact with the hybrid data storage device in a corresponding one of a plurality of interaction modes according to the operational state of the IHS, the interaction modes including: a hybrid mode, a hard disk drive mode, and a solid state drive mode;
operate in the hybrid mode in which both the magnetic disk drive component and the solid state drive component are addressable by the interfacing processor, in response to a determination that the IHS is operating in either (a) the initialization state in which the interfacing processor is configured to load a primary operating system from the magnetic disk drive component and establish a partition in the solid state drive component for hosting an alternate operating system and a cache of persistently accessible files, or (b) the recovery state in which files stored in the cache of persistently accessible files stored on the solid state component are accessible by the interfacing processor;
operate in the hard disk drive mode in which only the magnetic disk drive component is addressable by the interfacing processor in response to a determination that the IHS is operating in the normal operation state in which a subset of files stored by the primary operating system on the magnetic disk drive component is copied to the cache of persistently accessible files; and
operate in the solid state drive mode in which only the solid state drive component is addressable by the interfacing processor in response to a determination that the IHS is operating in the degraded state in which the alternate operating system hosted by the solid state component is configured to run on the interfacing processor in response to a detected degradation of a performance characteristic of the primary operating system or the magnetic disk drive component.

3. An Information Handling System (IHS), comprising:
a hybrid data storage device having a magnetic disk drive component and a solid state drive component;
an interfacing processor configured to interface with the hybrid data storage device; and
a memory coupled to the interfacing processor, the memory including program instructions stored thereon that, upon execution by the interfacing processor, cause the interfacing processor to:
automatically identify a first operational state of the IHS, wherein the first operational state is selected from the group consisting of: an initialization state, a normal state, a degraded state, and a recovery state;
automatically interact with the hybrid data storage device in a first one of a plurality of interaction modes corresponding to the first operational state of the IHS, wherein the interaction modes include: a hybrid mode, a hard disk drive mode, or a solid state drive mode;
automatically identify a change from the first operational state to a second operational state; and
in response to the automatic identification of the change, automatically interact with the hybrid data storage device in the second interaction mode, wherein the second interaction mode corresponds to the second operational state, wherein the magnetic disk drive component is configured to store a primary operating system and primary files, and wherein the solid state drive component is configured to store an alternate operating system and a cache of persistently accessible files, and wherein in the hard disk drive mode—only the magnetic disk drive component is addressable by the primary operating system to the exclusion of the solid state drive component, such that the hybrid data storage device appears as a magnetic disk drive only to a user and to applications running on the primary operating system.

4. The IHS of claim 3, wherein in the normal state the interfacing processor is configured to interface with the hybrid data storage device in the hard disk drive mode, and wherein a selected subset of files stored by the primary operating system on the hard disk drive component is copied to the cache of persistently accessible files on the solid state drive component by a background process.

5. An Information Handling System (IHS), comprising:
a hybrid data storage device having a magnetic disk drive component and a solid state drive component;
an interfacing processor configured to interface with the hybrid data storage device; and
a memory coupled to the interfacing processor, the memory including program instructions stored thereon that, upon execution by the interfacing processor, cause the interfacing processor to:
automatically identify a first operational state of the IHS, wherein the first operational state is selected from the group consisting of: an initialization state, a normal state, a degraded state, and a recovery state;
automatically interact with the hybrid data storage device in a first one of a plurality of interaction modes corresponding to the first operational state of the IHS, wherein the interaction modes include: a hybrid mode, a hard disk drive mode, or a solid state drive mode;
automatically identify a change from the first operational state to a second operational state; and
in response to the automatic identification of the change, automatically interact with the hybrid data storage device in the second interaction mode, wherein the second interaction mode corresponds to the second operational state, wherein the magnetic disk drive component is configured to store a primary operating system and primary files, and wherein the solid state drive component is configured to store an alternate operating system and a cache of persistently accessible files, wherein in the hybrid mode both the magnetic disk drive component and the solid state drive component are addressable, and wherein in the solid state drive mode only the solid state drive component is addressable by the alternate operating system to the exclusion of the magnetic disk drive component.

6. The IHS of claim 5, wherein in the degraded state the interfacing processor is configured to interact with the hybrid data storage device in the solid state drive mode, and the alternate operating system hosted by the solid state component is configured to run on the interfacing processor to access the cache of persistently accessible files in response to a detected degradation of a performance characteristic of the primary operating system or the hard disk drive component.

7. The IHS of claim 6, wherein in the recovery state the interfacing processor is configured to interact with the hybrid data storage device in the hybrid mode, and wherein the primary files stored in the magnetic disk drive component are addressable by the alternate operating system.

* * * * *